(12) United States Patent
Fujimoto et al.

(10) Patent No.: US 7,847,012 B2
(45) Date of Patent: Dec. 7, 2010

(54) VINYL CHLORIDE RESIN COMPOSITION AND MOLDED ARTICLE THEREOF

(75) Inventors: Tatsuya Fujimoto, Kamisu (JP); Ken Yahata, Kamisu (JP); Tadashi Amano, Kamisu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 775 days.

(21) Appl. No.: 11/758,418

(22) Filed: Jun. 5, 2007

(65) Prior Publication Data

US 2007/0282027 A1 Dec. 6, 2007

(30) Foreign Application Priority Data

Jun. 6, 2006 (JP) ............................... 2006-157376

(51) Int. Cl.
*C08L 27/06* (2006.01)
(52) U.S. Cl. .................. 524/527; 524/121; 524/127; 524/136; 524/140; 524/141; 524/425; 524/430; 524/515; 524/520
(58) Field of Classification Search ........................ None
See application file for complete search history.

(56) References Cited

U.S. PATENT DOCUMENTS 5,679,741 A * 10/1997 Breton et al. ................. 525/71
7,416,780 B2 * 8/2008 Leite et al. ............... 428/307.3
2005/0192389 A1 * 9/2005 Lee et al. .................... 524/306

FOREIGN PATENT DOCUMENTS

| JP | 7-278386 | | 10/1995 |
| JP | 10-95887 | | 4/1998 |
| JP | 11-199680 | | 7/1999 |
| JP | 2001-347626 | | 12/2001 |
| JP | 2003-64209 | | 3/2003 |
| JP | 2003-226772 | | 8/2003 |
| JP | 2004-204193 | | 7/2004 |
| JP | 2005-255921 | | 9/2005 |
| WO | WO 91/09912 | * | 7/1991 |
| WO | WO 01/94472 A1 | | 12/2001 |
| WO | WO 2004/015016 | * | 2/2004 |

* cited by examiner

*Primary Examiner*—Marc S Zimmer
(74) *Attorney, Agent, or Firm*—Oblon, Spivak, McClelland, Maier & Neustadt, L.L.P.

(57) ABSTRACT

A thermally expandable vinyl chloride resin composition is provided. It includes (A) 100 parts by mass of a vinyl chloride resin, (B) 5 to 200 parts by mass of an inorganic filler, (C) 10 to 300 parts by mass of a thermally expandable graphite, (D) 0.1 to 10 parts by mass of a fluororesin, and (E) 10 to 300 parts by mass of a phosphorus compound. The composition exhibits favorable thermal expansion properties and favorable shape retention following thermal expansion upon exposure to high temperatures.

13 Claims, No Drawings

VINYL CHLORIDE RESIN COMPOSITION AND MOLDED ARTICLE THEREOF

BACKGROUND ART

1. Field of the Invention

The present invention relates to a vinyl chloride resin composition having thermal expandability, and relates more particularly to a thermally expandable vinyl chloride resin composition and a molded article thereof which exhibit excellent thermal expandability, excellent shape retention following expansion of the molded article, and for which continuous molding by extrusion molding or calender molding or the like can be conducted with ease.

2. Description of the Prior Art

In the field of building materials, the fire resistance of materials in the case of fire has always been considered important. Recently, a variety of different resins have been used to develop resin materials with fire resistance properties. Desirable fire resistance properties include not only resistance to combustion for the resin material itself, but also an ability of the material to resist collapse and maintain its shape to form an insulating layer, thereby blocking flames and smoke, even when the material is exposed to high temperatures during a fire. Examples of proposed materials that are capable of forming an insulating layer include a material that uses an epoxy resin as the base resin and a thermally expandable graphite as a foaming agent (see patent reference 1), and a material that uses a vulcanized rubber as the base resin (see patent reference 2). However, these materials are produced mainly by batch production methods such as press molding, and because they are unsuited to continuous production by extrusion molding or the like, the productivity tends to be poor.

A material that utilizes the flame retardancy and moldability of a polyvinyl chloride resin, and comprises a polyvinyl chloride resin, a thermally expandable graphite, an inorganic filler and a phosphorus compound, has also been proposed (see patent reference 3). This material exhibits favorable fire resistance, but because it requires the addition of a large quantity of additives, and because the phosphorus compound such as ammonium polyphosphate tends to adhere to metal during processing, molding of the material is difficult, which tends to result in poor productivity.

[Patent Reference 1] Japanese Laid-open publication (kokai) No. 2003-64209

[Patent Reference 2] Japanese Laid-open publication (kokai) No. 2003-226772

[Patent Reference 3] Japanese Laid-open publication (kokai) No. Hei 10-95887

SUMMARY OF THE INVENTION

Accordingly, the present invention provides a thermally expandable vinyl chloride resin composition which exhibits favorable thermal expansion properties and favorable shape retention following thermal expansion upon exposure to high temperatures, is suited to continuous molding using extrusion molding or calender molding or the like, and enables molded articles to be obtained with a high level of productivity. The invention also provides a molded article formed using such a composition.

As a result of intensive investigations aimed at resolving the problems described above, the inventors developed the present invention by using a phosphorus compound, also using a fluororesin, and by appropriately adjusting the quantities of each of the components.

In other words, the present invention provides a thermally expandable vinyl chloride resin composition, comprising:

(A) 100 parts by mass of a vinyl chloride resin, (B) 5 to 200 parts by mass of an inorganic filler, (C) 10 to 300 parts by mass of a thermally expandable graphite, (D) 0.1 to 10 parts by mass of a fluororesin, and (E) 10 to 300 parts by mass of a phosphorus compound.

Furthermore, the present invention also provides a molded article obtained by molding the above composition.

DETAILED DESCRIPTION OF THE PREFERRED EMBODIMENTS

As follows is a more detailed description of the present invention. Representative embodiments of the invention include those described below.

The above composition preferably also comprises from 10 to 100 parts by mass of a plasticizer.

In the above composition, the phosphorus compound of the component (E) preferably comprises a nitrogen-containing organophosphate compound represented by a general formula (1).

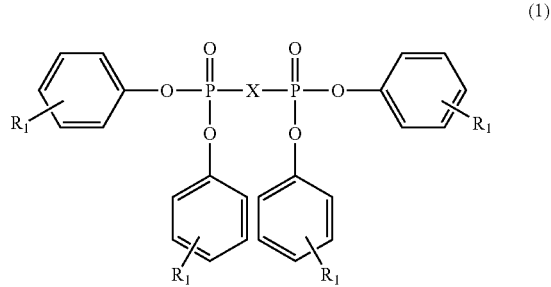

(1)

(wherein, each $R_1$ represents, independently, a hydrogen atom or an alkyl group, and X represents a bivalent organic group that contains a nitrogen atom).

In the above composition, the phosphorus compound of the component (E) preferably comprises an organophosphinate compound represented by a general formula (2).

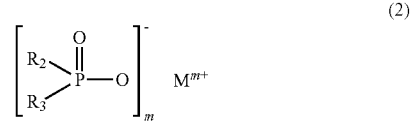

(2)

(wherein, $R_2$ and $R_3$ each represent, independently, an unsubstituted or substituted monovalent hydrocarbon group, M represents an alkali metal, alkaline earth metal, transition metal, or representative element of group 14 of the periodic table, and m represents an integer from 1 to 4).

In the above composition, the phosphorus compound of the component (E) preferably comprises at least one nitrogen-containing organophosphate compound represented by the above general formula (1), and at least one organophosphinate compound represented by the above general formula (2).

As follows is a detailed description of each of the components of a composition of the present invention.

—(A) Vinyl Chloride Resin—

The vinyl chloride resin used in the present invention is either a vinyl chloride homopolymer, or a copolymer comprising vinyl chloride and another monomer that is copolymerizable with vinyl chloride, wherein the proportion of vinyl chloride is 50% by weight or greater. Examples of the monomer that is copolymerizable with vinyl chloride include lower aliphatic acid vinyl esters such as vinyl acetate and vinyl propionate; acrylic acid and methacrylic acid; acrylate esters such as methyl acrylate and ethyl acrylate; methacrylate esters such as methyl methacrylate and ethyl methacrylate; olefins such as ethylene and propylene; as well as acrylonitrile, styrene and vinylidene chloride. These monomers that are copolymerizable with vinyl chloride can be used in combination of two or more thereof with vinyl chloride.

In order to obtain more favorable mechanical properties for the molded product, and ensure a more suitable melt viscosity for the vinyl chloride resin during molding, the average polymerization degree of the vinyl chloride resin used in the present invention is preferably within a range from 400 to 3,000, and is even more preferably from 700 to 1,300. In this description, the average polymerization degree refers to the average polymerization degree determined in accordance with the vinyl chloride resin test method disclosed in JIS K 6271.

—(B) Inorganic Filler—

There are no particular restrictions on the inorganic filler of the component (B), and any of the inorganic fillers typically added to conventional vinyl chloride resin compositions can be used. Examples of suitable fillers include calcium carbonate, titanium oxide, silica, magnesium hydroxide, aluminum hydroxide, talc and clay. Of these, calcium carbonate is preferred. A single inorganic filler may be used alone, or a combination of two or more different inorganic fillers may be used.

The addition of this inorganic filler performs the roles of reducing costs by increasing the composition weight, and improving the flame retardancy by increasing the heat capacity. The quantity added of the inorganic filler is within a range from 5 to 200 parts by mass, and preferably from 5 to 50 parts by mass, per 100 parts by mass of the component (A). If this quantity is less than 5 parts by mass, then achieving the above effects becomes difficult, whereas if the quantity exceeds 200 parts by mass, then the melt viscosity during molding becomes overly high, making molding difficult.

—(C) Thermally Expandable Graphite—

The thermally expandable graphite of the component (C) acts as a foaming component, and is an essential component of the composition. There are no particular restrictions on the thermally expandable graphite, and conventional materials can be used. When the thermally expandable graphite is exposed to heat, gas is generated as a result of the chemical substances and the like contained within the graphite, which results in an expansion of the scale-like graphite. One example of a suitable thermally expandable graphite is the product "SYZR1002", which is available commercially from Sanyo Trading Co., Ltd.

The quantity added of the component (C) is within a range from 10 to 300 parts by mass, and preferably from 50 to 200 parts by mass, per 100 parts by mass of the component (A). If the quantity added is less than 10 parts by mass, then achieving the flame retardancy effect generated by thermal expansion becomes difficult, whereas if the quantity exceeds 300 parts by mass, not only does molding become more difficult, but the shape retention properties of the molded article generated upon foaming tend to be poor.

—(D) Fluororesin—

The fluororesin of the component (D) is added to enable a stable molded article to be obtained. This component is added in a quantity within a range from 0.1 to 10 parts by mass, and preferably from 0.1 to 2 parts by mass, per 100 parts by mass of the component (A). If this quantity is less than 0.1 parts by mass, then in those cases where extrusion molding is conducted, although a molded article can be obtained, inadequate kneading increases the likelihood of a molded article with inferior surface smoothness. In contrast, if the quantity exceeds 10 parts by mass, then overly effective kneading tends to result in a molded article that is unsatisfactory in terms of properties such as the waviness of the molded surface.

Examples of fluororesins that can be used include tetrafluoroethylene resins, perfluoroalkoxyalkanes, ethylene-tetrafluoroethylene copolymers, perfluoroethylene-propene copolymers, polyvinylidene fluorides, and ethylene-chlorofluoroethylene copolymers. These fluororesins can be used singly or in combination of two or more thereof. Of these, tetrafluoroethylene resins are preferred.

—(E) Phosphorus Compound—

The phosphorus compound of the component (E) performs the roles of improving the flame retardancy of the composition of the present invention, and improving the shape retention properties of the molded article by forming a carbonized layer upon combustion and expansion. Examples of this phosphorus compound include nitrogen-containing organophosphate compounds represented by the general formula (1).

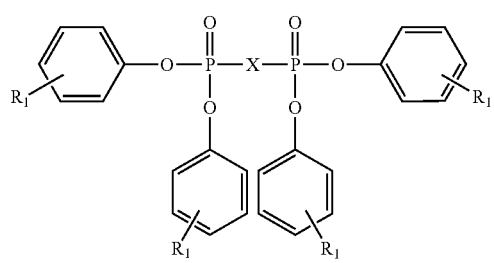

(1)

(wherein, each $R_1$ represents, independently, a hydrogen atom or an alkyl group, and preferably a hydrogen atom, and X represents a bivalent organic group that contains a nitrogen atom)

In the above general formula (1), an example of the bivalent organic group containing a nitrogen atom represented by X is shown below.

Examples of the nitrogen-containing organophosphate compounds represented by the general formula (1) include the aromatic piperazine phosphates represented by a general formula (3) shown below.

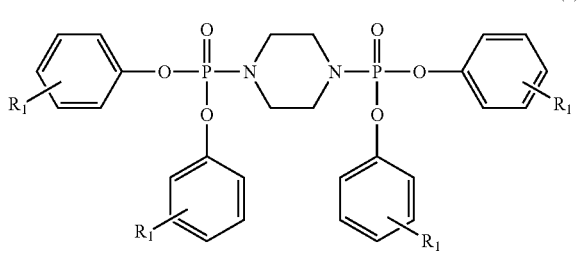

(wherein, $R_1$ is as defined above)

A specific example of a compound of the general formula (3) is the compound shown below.

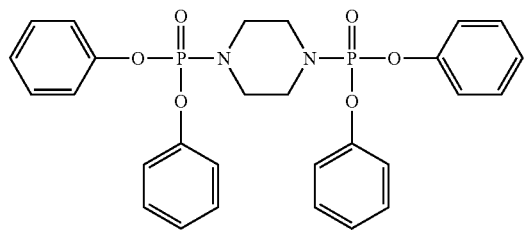

There are no particular restrictions on the method used for producing nitrogen-containing organophosphate compounds represented by the general formula (1). In the case of aromatic piperazine phosphates represented by the above general formula (3), the desired compound can be produced by reacting 1 mol of piperazine with 2 mols of a substituted diphenylphosphonyl chloride represented by a general formula (4) shown below, in the presence of an amine catalyst such as triethylamine.

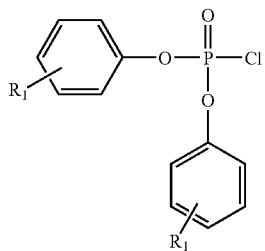

(wherein, $R_1$ is as defined above).

This production method is described in detail in Japanese Laid-open publication (kokai) No. Hei 10-175985.

Other examples of phosphorus compounds of the component (E) include organophosphinate compounds represented by the general formula (2) shown below.

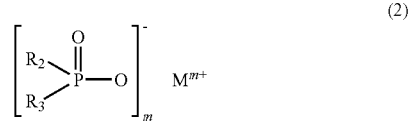

(wherein, $R_2$ and $R_3$ each represent, independently, an unsubstituted or substituted monovalent hydrocarbon group, which is typically a group of 1 to 30 carbon atoms, and preferably a group of 1 to 20, and even more preferably 1 to 10 carbon atoms, M represents an alkali metal, alkaline earth metal, transition metal, or representative element of group 14 of the periodic table, and m represents an integer from 1 to 4)

In the above general formula (2), examples of M include alkali metals such as lithium, sodium and potassium; alkaline earth metals such as magnesium, calcium, strontium and barium; transition metals such as iron, cobalt, nickel, titanium and zinc; and representative elements of group 14 such as aluminum. Of these, aluminum is preferred.

In the above general formula (2), examples of the unsubstituted or substituted monovalent hydrocarbon groups represented by $R_2$ and $R_3$ include alkyl groups such as a methyl group, ethyl group, n-propyl group, isopropyl group, n-butyl group, t-butyl group, n-pentyl group or n-hexyl group; alkenyl groups such as a vinyl group or allyl group; aryl groups such as a phenyl group, tolyl group, xylyl group or naphthyl group; and aralkyl groups such as a benzyl group or phenethyl group. Of these, alkyl groups of 1 to 3 carbon atoms are preferred, and an ethyl group is the most desirable.

Specific examples of organophosphinate compounds represented by the general formula (2) include aluminum organophosphinates, calcium organophosphinates and zinc organophosphinates, and of these, aluminum organophosphinates are preferred, aluminum dialkylphosphinates are even more preferred, and aluminum diethylphosphinate is the most desirable.

The phosphorus compound of the component (E) is typically added in a quantity within a range from 10 to 300 parts by mass, and preferably from 10 to 100 parts by mass, per 100 parts by mass of the vinyl chloride resin of the component (A). If the quantity added is less than 10 parts by mass, then the shape retention following expansion of the molded article tends to deteriorate. In contrast, quantities exceeding 300 parts by mass not only make it difficult to achieve satisfactory thermal expansion properties, but are also undesirable in terms of cost.

—Other Components—

In addition to the essential components described above, a composition of the present invention may also include other optional components if required, provided the addition of these other components does not impair the objects and effects of the present invention. As follows is a description of other components which are preferably added according to need.

Plasticizers

Any of the plasticizers typically added to vinyl chloride resin compositions can be used, and specific examples of suitable plasticizers include phthalic acid derivatives such as di-(2-ethylhexyl)phthalate, di-isononyl phthalate, di-isodecyl phthalate, di-tridecyl phthalate, and mixed phthalate esters of higher alcohols; trimellitic acid derivatives such as tri-(2-ethylhexyl)trimellitate, tri-(n-octyl)trimellitate, and tri-isooctyl trimellitate; adipic acid derivatives such as di-(2-ethylhexyl)adipate, di-isononyl adipate, di-isodecyl adipate, and mixed adipate esters of higher alcohols; azelaic acid derivatives such as di-(2-ethylhexyl)azelate, di-isooctyl azelate, and di-(n-hexyl)azelate; sebacic acid derivatives such as di-(2-ethylhexyl)sebacate and di-isooctyl sebacate; sulfonic acid derivatives such as phenol-based alkylsulfonates; epoxy derivatives such as epoxidized soybean oil and epoxidized flaxseed oil; and polyester-based plasticizers that are polymerized esters produced from a dicarboxylic acid such as adipic acid, azelaic acid, sebacic acid or phthalic acid, and a bivalent alcohol such as ethylene glycol, propylene glycol or butylene glycol. These plasticizers may be used either alone, or in combinations of two or more different plasticizers.

Of the plasticizers listed above, high molecular weight plasticizers are preferred in terms of their migration properties, extrusion properties and bleed properties, and trimellitic acid-based plasticizers and polyester-based plasticizers are particularly desirable.

The quantity added of the plasticizer can be adjusted as appropriate, but if due consideration is given to factors such as the melt viscosity of the composition, which effects the moldability, as well as the brittleness, toughness, flame retardancy and smoke-forming properties upon combustion of the resulting molded article, then the quantity of the plasticizer is typically within a range from 10 to 100 parts by mass per 100 parts by mass of the vinyl chloride resin of the component (A). If this quantity is too high, then the flame retardancy tends to deteriorate, and the quantity of smoke formed upon combustion tends to increase.

Auxiliary Foaming Agents

An auxiliary foaming agent may be added to supplement and increase the level of foaming generated by the component (C). Examples of this auxiliary foaming agent include azo compounds such as azodicarbonamide, hydrazine compounds such as 4,4'-oxybis(benzenesulfonyl hydrazide), nitroso compounds such as N,N'-dinitrosopentamethylenetetramine, and bicarbonates such as sodium bicarbonate.

Lubricants

A lubricant may also be added to a composition of the present invention according to need. Adding a lubricant improves the slipperiness between the resin and metals, which improves the moldability of the composition and the surface properties of the resulting molded article. The lubricant also suppresses adhesion between the composition and metals, thereby suppressing plate-out.

Examples of suitable lubricants include paraffin waxes in which the number of carbon atoms is within a range from approximately 20 to 70; hydrocarbon-based lubricants such as polyethylene waxes with a molecular weight within a range from approximately 1,000 to 5,000; fatty acid-based lubricants such as myristic acid, stearic acid, hydroxystearic acid, palmitic acid, arginine and behenic acid; ester-based lubricants, including lower or higher alcohol esters of fatty acids such as stearic acid, arachic acid and behenic acid, esters of a higher fatty acid with glycerol, pentaerythritol or dipentaerythritol, and higher alcohol esters of montanic acid; fatty acid amide-based lubricants such as stearylamide, palmitylamide, oleylamide, behenamide, methylenebisstearoamide, ethylenebisstearoamide, ethylenebisoleylamide, and ethylenebislaurylamide; higher alcohol-based lubricants such as stearyl alcohol, coconut alcohol, cetyl alcohol, and myristyl alcohol; and metal soaps comprising a fatty acid such as stearic acid, 12-hydroxystearic acid or behenic acid, and a metal such as magnesium, calcium, barium, zinc, or aluminum. These lubricants may be used either alone, or in combinations of two or more different lubricants.

Of the lubricants listed above, the use of hydrocarbon-based lubricants such as polyethylene waxes, ester-based lubricants, or 12-hydroxystearic acid is preferred.

The quantity added of the lubricant is preferably within a range from 0.1 to 5 parts by mass per 100 parts by mass of the vinyl chloride resin of the component (A). If this quantity is too large, then the lubrication properties achieved are excessive, and the moldability tends to deteriorate.

Smoke Suppressants

In order to suppress the quantity of smoke generated upon combustion, a smoke suppressant such as zinc stannate, zinc hydroxystannate or zinc borate may also be added to the composition.

Stabilizers

A stabilizer is preferably added to inhibit thermal decomposition of the composition of the present invention during molding. Examples of suitable stabilizers include conventional Pb-based, Sn-based, Ba/Zn-based or Ca/Zn-based stabilizers used in typical hard vinyl chloride resins.

Furthermore, in order to improve the moldability and the physical properties of the composition, other improvers such as acrylic processing aids, acrylonitrile-butadiene-styrene copolymers (ABS resins), methyl methacrylate-butadiene-styrene copolymers (MBS resins), acrylic polymers, and chlorinated polyethylene may also be added.

—Molding/Processing—

Examples of methods that can be used for molding and processing a vinyl chloride resin composition of the present invention include those molding methods typically employed for vinyl chloride resins, such as compression molding, extrusion molding and calender molding. A composition of the present invention offers the advantage of being suitable for continuous production methods such as extrusion molding and calender molding, and the use of these methods yields a favorable level of productivity. Accordingly, extrusion molding and calender molding methods are preferred, and extrusion molding is particularly desirable.

EXAMPLES

As follows is a more detailed description of the present invention based on a series of examples, although the present invention is in no way limited by these examples.

(Materials and Components)

In the examples and comparative examples described below, the following materials and components were used.

Vinyl Chloride Resins

TK-800 (manufactured by Shin-Etsu Chemical Co., Ltd., average polymerization degree: 820)

TK-1300 (manufactured by Shin-Etsu Chemical Co., Ltd., average polymerization degree: 1300)

Thermal Stabilizers

Ba/Zn-based stabilizer: RUP-14 (manufactured by Adeka Corporation)

Ba/Zn-based stabilizer: AC-186 (manufactured by Adeka Corporation)

Plasticizer tri-2-ethylhexyl trimellitate: TOTM (manufactured by Adeka Corporation)

Lubricants

Polyethylene-based lubricant: Hiwax 220 MP (manufactured by Mitsui Chemicals, Inc.)

Ester-based lubricant: EW-100 (manufactured by Riken Vitamin Co., Ltd.)

Inorganic Filler

Calcium carbonate: NS-400 (manufactured by Nitto Funka Kogyo Co., Ltd.)

Tetrafluoroethylene Resin

FA-500 (manufactured by Daikin Industries, Ltd.)

Thermally Expandable Graphite

SYZR1002 (manufactured by Sanyo Trading Co., Ltd.)

Nitrogen-Containing Organophosphate Compound

SP-703 (manufactured by Shikoku Chemicals Corporation)

Phosphinate Compound (Aluminum Diethylphosphinate) Exolit OP-930 (manufactured by Clariant Ltd.)

(Preparation of Vinyl Chloride Resin Compound)

In each of the examples and comparative examples, the materials and components shown in Table 1 were mixed together in a mixer with a capacity of 10 L using the blend quantities shown in the table, and when the resin temperature inside the mixer reached 120° C., the resulting compound was removed and cooled to 50° C.

(Preparation of Molded Articles)

Each compound was kneaded using a 20 mmφ uniaxial extrusion molding apparatus (screw CR=3.0, 60 rpm), and extrusion molding was then conducted using a T-die, thus forming an extrusion molded sheet (thickness: approximately 1.5 mm). The heating sections of the apparatus were termed C1, C2 and C3 in sequence from the hopper-side of the apparatus, and the molding was conducted with the temperatures set to 110° C. at C1, 120° C. at C2 and 130° C. at C3, and with the temperature at the die set to 140° C.

The properties of the thus obtained molded articles were evaluated in the manner described below. The results are shown in Table 1.

[Evaluation of Extrusion Properties]

The extrusion properties within the above molding process were evaluated by visually inspecting the obtained molded article, and assigning an evaluation based on the following criteria.

A: The shape of the edge portions and the smoothness of the surface were excellent.

B: The shape of the edge portions and the smoothness of the surface were good.

C: The shape of the edge portions and the smoothness of the surface were a little poor.

D: The shape of the edge portions and the smoothness of the surface were poor.

[Evaluation of Plate-Out]

Evaluation of the plate-out properties was conducted by dismantling the extrusion apparatus following completion of the extrusion molding, visually inspecting the metal surfaces of the cylinder, the screw and the die that were in contact with the resin composition, and evaluating the degree of plate-out contamination based on the following criteria.

A: Absolutely no plate-out matter was observed.

B: Almost no plate-out matter was observed.

C: A small quantity of plate-out matter was observed.

D: A large quantity of plate-out matter was observed.

[Expandability Test]

A square test piece with a thickness of approximately 1.5 mm and a length along each side of 2 cm was cut from each molded article. This test piece was placed in an electric oven at 600° C., and once expansion of the test piece was totally complete, the test piece was removed from the oven.

Expansion factor: The thickness and the width of the test piece were measured prior to treatment in the oven and then measured again following removal from the oven, and these values were used to calculate expansion factors.

Shape retention: The expanded test piece obtained by treatment in the oven was evaluated visually, and by touch, for hardness, shape, and for resistance to breakage, and an evaluation was assigned based on the following criteria.

A: The shape retention properties were excellent.

B: The shape retention properties were good.

D: The shape retention properties were poor.

TABLE 1

|  |  | Example 1 | Example 2 | Example 3 | Example 4 | Comparative example 1 | Comparative example 2 | Comparative example 3 |
|---|---|---|---|---|---|---|---|---|
| Vinyl chloride resin | TK-800 | 100 |  | 100 | 100 | 100 | 100 |  |
|  | TK-1300 |  | 100 |  |  |  |  | 100 |
| Thermal stabilizer | RUP-14 | 2 | 2 | 2 | 2 | 2 | 2 | 2 |
|  | AC-186 | 1 | 1 | 1 | 1 | 1 | 1 | 1 |
| Plasticizer | TOTM | 50 | 80 | 50 | 50 | 50 | 50 | 50 |
| Lubricant | Hiwax 220MP | 0.3 | 0.3 | 0.3 | 0.3 | 0.3 | 0.3 | 0.3 |
|  | EW-100 | 0.5 | 0.5 | 0.5 | 0.5 | 0.5 | 0.5 | 0.5 |
| Tetrafluoroethylene resin | FA-500 | 0.5 | 0.7 | 0.7 | 1 | 0 | 20 | 0.7 |
| Inorganic filler | Calcium carbonate | 10 | 10 | 10 | 10 | 10 | 10 | 10 |
| Phosphinate compound or nitrogen-containing organophosphate compound | SP-703 | 20 | 10 | 15 | 0 | 0 | 350 | 10 |
|  | OP-930 | 0 | 0 | 10 | 40 | 0 | 0 | 10 |
| Thermally expandable graphite | SYZR1002 | 100 | 100 | 150 | 150 | 150 | 150 | 5 |
| Extrusion properties |  | A | A | A | A | D | C | B |
| Plate-out properties |  | B | B | A | A | D | C | B |
| Expansion factor | Thickness | 17 | 14 | 18 | 18 | 15 | 12 | 4 |
|  | Width | 2.3 | 2.3 | 2.6 | 2.8 | 2.0 | 2.2 | 1.3 |
| Shape retention |  | B | B | A | A | D | B | D |

What is claimed is:

1. A thermally expandable vinyl chloride resin composition, comprising:

(A) 100 parts by mass of a vinyl chloride resin, (B) 5 to 200 parts by mass of an inorganic filler, (C) 10 to 300 parts by mass of a thermally expandable graphite, (D) 0.1 to 10 parts by mass of a fluororesin, and (E) 10 to 300 parts by mass of a phosphorus compound, wherein said phosphorus compound of said component (E) comprises a nitrogen organophosphate compound represented by a general formula (1):

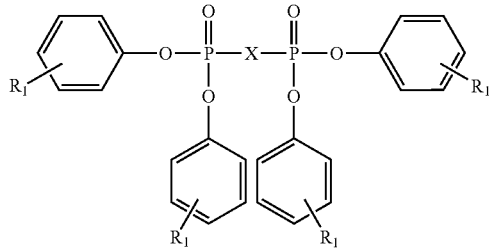

wherein, each $R_1$ represents, independently, a hydrogen atom or an alkyl group, and X represents a bivalent organic group that contains a nitrogen atom.

2. The composition according to claim 1, further comprising from 10 to 100 parts by mass of a plasticizer.

3. The composition according to claim 1, wherein the vinyl chloride resin of the component (A) is a vinyl chloride homopolymer, or a copolymer comprising vinyl chloride and another monomer that is copolymerizable with vinyl chloride.

4. The composition according to claim 3, wherein the monomer that is copolymerizable with vinyl chloride comprises a lower aliphatic acid vinyl ester, acrylic acid, methacrylic acid, an acrylate ester, a methacrylate ester, an olefin, acrylonitrile, styrene, vinylidene chloride, or a combination of two or more thereof.

5. The composition according to claim 1, wherein the vinyl chloride resin of the component (A) has an average polymerization degree of 400 to 3,000.

6. The composition according to claim 1, wherein said inorganic filler of the component (B) comprises calcium carbonate, titanium oxide, silica, magnesium hydroxide, aluminum hydroxide, talc, clay, or a combination of two or more thereof.

7. The composition according to claim 1, wherein the fluororesin of the component (D) comprises a tetrafluoroethylene resin, perfluoroalkoxyalkane, ethylene-tetrafluoroethylene copolymer, perfluoroethylene-propene copolymer, polyvinylidene fluoride, ethylene-chlorofluoroethylene copolymer, or a combination of two or more thereof.

8. The composition according to claim 1, wherein said nitrogen organophosphate compound is represented by a general formula (3):

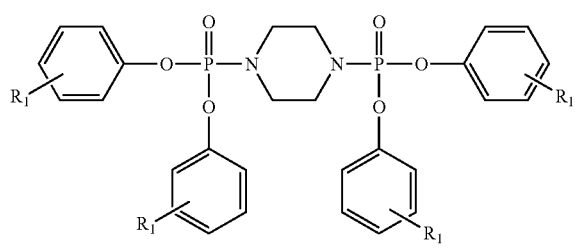

wherein $R_1$ is as defined above.

9. A thermally expandable vinyl chloride resin composition, comprising:
CA) 100 parts by mass of a vinyl chloride resin,
(B) 5 to 200 parts by mass of an inorganic filler,
(C) 10 to 300 parts by mass of a thermally expandable graphite,
(D) 0.1 to 10 parts by mass of a fluororesin, and
(E) 10 to 300 parts by mass of a phosphorus compound,
wherein said phosphorus compound of said component (E) comprises at least one nitrogen-containing organophosphate compound represented by said general formula (1)

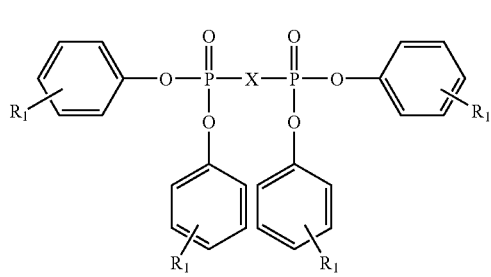

wherein, each $R_1$ represents, independently, a hydrogen atom or an alkyl group, and X represents a bivalent organic group that contains a nitrogen atom, and at least one organophosphinate compound represented by said general formula (2)

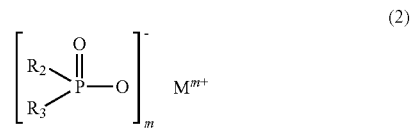

wherein, $R_2$ and $R_3$ each represent, independently, an unsubstituted or substituted monovalent hydrocarbon group, M represents an alkali metal, alkaline earth metal, transition metal, or representative element of group 14 of the periodic table, and m represents an integer from 1 to 4.

10. The composition according to claim 1, further comprising an auxiliary foaming agent, a lubricant, a smoke suppressant, a stabilizer, or a combination of two or more thereof.

11. The composition according to claim 9, wherein M represents aluminum, and $R_2$ and $R_3$ each represent an alkyl group of 1 to 3 carbon atoms.

12. The composition according to claim 9, wherein said organophosphinate compound represented by a general formula (2) is an aluminum dialkylphosphinate.

13. A molded article obtained by molding a thermally expandable vinyl chloride resin composition, comprising:

(A) 100 parts by mass of a vinyl chloride resin,
(B) 5 to 200 parts by mass of an inorganic filler,
(C) 10 to 300 parts by mass of a thermally expandable graphite,
(D) 0.1 to 10 parts by mass of a fluororesin, and
(E) 10 to 300 parts by mass of a phosphorus compound, wherein said phosphorus compound of said component (E) comprises a nitrogen organophosphate compound represented by a general formula (1):

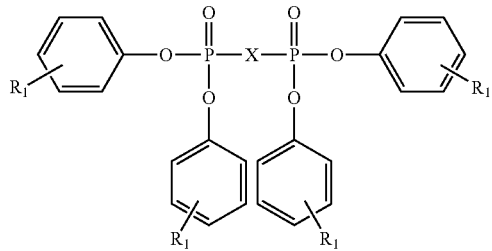

wherein, each $R_1$ represents, independently, a hydrogen atom or an alkyl group, and X represents a bivalent organic group that contains a nitrogen atom.

* * * * *